United States Patent [19]

Narang et al.

[11] Patent Number: 5,254,664
[45] Date of Patent: Oct. 19, 1993

[54] CURING COMPOSITION

[75] Inventors: Subhash C. Narang, Redwood City; Asutosh Nigam; Apparao Satyam, both of Menlo Park; Susanna C. Ventura, Mountain View, all of Calif.; Yoshihiro Arita, Osaka, Japan

[73] Assignee: Nippon Shokubai Co., Ltd., Osaka, Japan

[21] Appl. No.: 815,227

[22] Filed: Dec. 31, 1991

[51] Int. Cl.$^5$ ............... C08G 69/00; C08G 14/04; C08G 8/04; C08G 14/02

[52] U.S. Cl. .................... 528/137; 528/138; 528/141; 528/143; 528/145; 528/147; 528/150; 528/153; 528/219; 528/403; 528/408; 528/409; 528/410; 428/411.1

[58] Field of Search ............... 528/403, 363, 207, 208, 528/137, 405, 407, 210, 211, 327, 331, 408, 409, 410, 137, 138, 141, 145, 147, 150, 153, 219; 428/411.1

[56] References Cited

U.S. PATENT DOCUMENTS

| | | | |
|---|---|---|---|
| 4,430,491 | 2/1984 | Culbertson et al. | 528/153 |
| 4,474,942 | 10/1984 | Sano et al. | 528/363 |
| 4,600,766 | 7/1986 | Arita et al. | 528/172 |
| 4,613,662 | 9/1986 | Goel | 528/137 |
| 4,699,970 | 10/1987 | Tiba et al. | 528/141 |
| 4,737,574 | 4/1988 | Goel | 528/374 |
| 4,746,719 | 5/1988 | Goel et al. | 528/137 |
| 4,748,230 | 5/1988 | Tiba et al. | 528/211 |
| 4,764,587 | 8/1988 | Sano et al. | 528/363 |
| 4,831,111 | 5/1989 | Sano et al. | 528/363 |
| 4,837,302 | 6/1989 | Sano | 528/407 |
| 4,843,142 | 6/1989 | Sano et al. | 528/211 |
| 4,902,760 | 2/1990 | Arita et al. | 528/88 |
| 5,084,586 | 1/1992 | Farooq | 556/181 |

*Primary Examiner*—John Kight, III
*Assistant Examiner*—Richard Jones
*Attorney, Agent, or Firm*—Lowe, Price, LeBlanc & Becker

[57] ABSTRACT

A reaction of the compound (A) having at least two 2-oxazoline groups with the compound (B) having at least two functional groups of one or a plural kind selected from the group consisting of an aromatic hydroxyl group, an amino group and a thiol group proceeds in a short period of time to produce a cured resin with superior mechanical strength, heat resistance and adhesion properties.

2 Claims, No Drawings

CURING COMPOSITION

BACKGROUND OF THE INVENTION

The present invention relates to a curing composition which is useful for various uses such as molding materials and coatings, etc. In more detail, it relates to a curing composition composed of a compound (A) having at least two 2-oxazoline groups, a compound (B) having at least two functional groups of one or a plural kind selected from the group consisting of an aromatic hydroxyl group, an amino group and a thiol group, and an onium salt catalyst (C). Also, the present invention relates to a catalyst for the reaction of a compound (A) having at least two 2-oxazoline groups with a compound (B) having at least two functional groups of one or a plural kind selected from the group consisting of an aromatic hydroxyl group, an amino group and a thiol group, wherein the catalyst is an onium salt which is comprised of a cationic onium moiety and a counteranion. Furthermore, the present invention relates to a molded article prepared by curing a composition composed of a compound (A) having at least two 2-oxazoline groups, a compound (B) having at least two functional groups of one or a plural kind selected from the group consisting of an aromatic hydroxyl group, an amino group and a thiol group, and an onium salt catalyst (C).

It is known that a 2-oxazoline group reacts with a compound having an aromatic hydroxyl group in a ring opening type mechanism to provide an ether-amide.

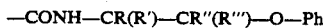

The method for preparing polymeric materials or crosslinked resins in accordance with the reaction is also known. Thus, the process to prepare a crosslinked resin by subjecting a mixture of a bis-2-oxazoline and a polymer having aromatic hydroxyl groups to reaction in the presence of a catalyst selected from a group consisting of phosphorous acid, organic phosphites and oxazoline ring-opening polymerization catalysts is exemplified in U.S. Pat. No. 4,843,142. Also, a poly(ether-amide) prepared by the step-growth polymerization reaction of an oxazoline compound with a phenolic resin is exemplified in U.S. Pat. No. 4,430,491. The other catalysts for the same reaction have been reported, for example, an alkali or an alkaline earth metal cationic complex in U.S. Pat. No. 4,613,662: a phosphite in U.S. Pat. No. 4,699,970; a triphenylmethyl carbonium ion salt in U.S. Pat. No. 4,746,719; and a phosphine catalyst in U.S. Pat. No. 4,748,230.

It is also known that a 2-oxazoline reacts with a compound having a thiol (mercapto) group to provide a thioether-amide.

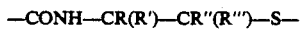

The process to prepare a thermosetting resin by subjecting a mixture of a bisoxazoline compound and a polythiol compound to reaction in the presence of an alkali metal cationic complex is exemplified in U.S. Pat. No. 4,737,574.

It is also known that a 2-oxazoline group reacts with a compound having an amino group to provide an amino-amide.

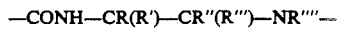

The process to prepare a thermosetting resin by subjecting a mixture of a bisoxazoline and an aromatic polyamine to reaction with heating in the presence of oxazoline ring-opening polymerization catalysts is exemplified in U.S. Pat. No. 4,837,302.

In these previous arts, a catalyst effective to the reaction of an oxazoline with a functional group differs from a catalyst for another functional group. Catalysts effective to the reaction of an oxazoline with various functional groups have not been known before those provided in the present invention.

SUMMARY OF THE INVENTION

In accordance with this invention, catalysts effective to the reaction of an oxazoline with various functional groups are provided. That is, the present invention provides a curing composition composed of a compound (A) having at least two 2-oxazoline groups (hereinafter, 2-oxazoline may be simply referred to as "oxazoline"), a compound (B) having at least two functional groups of one or a plural kind selected from the group consisting of an aromatic hydroxyl group, an amino group and a thiol group, and an onium salt catalyst (C). Also, it provides a catalyst for the reaction of the compound (A) having at least two 2-oxazoline groups with the compound (B) having at least two functional groups of one or a plural kind selected from the group consisting of an aromatic hydroxyl group, an amino group and a thiol group, wherein the catalyst is an onium salt which is comprised of a cationic onium moiety and a counteranion. Also, it provides a molded article prepared by curing a composition composed of the compound (A) having at least two 2-oxazoline groups, the compound (B) having at least two functional groups of one or a plural kind selected from the group consisting of an aromatic hydroxyl group, an amino group and a thiol group, and the onium salt catalyst (C).

The compound (A) useful in the practice of this invention includes a variety of such compounds having at least two oxazoline groups. The oxazoline group is represented by the following general formula (I);

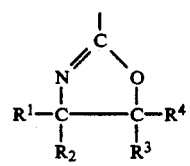

(I)

(in the formula, $R^1$, $R^2$, $R^3$, or $R^4$ independently represents a hydrogen, a halogen, an alkyl, an aralkyl, a phenyl, or a substituted phenyl group).

From the standpoint of potential commercial availability in commodity proportions, the polyoxazoline compounds derived from the reaction of dicarboxylic acids, polycarboxylic acids, dinitriles or trinitriles, with ethanolamines and the polymers having oxazoline groups are preferred.

Representative polyoxazoline compounds useful in the practice of this invention are as follows:
2,2'-bis(2-oxazoline),
2,2'-(1,2-ethylene)-bis(2-oxazoline),
2,2'-(1,4-butylene)-bis(2-oxazoline),
2,2'-(1,3-phenylene)-bis(2-oxazoline),
2,2'-(1,4-phenylene)-bis(2-oxazoline),
2,2'-(1,3-phenylene)-bis(4,4-dimethyl-2-oxazoline), bis(2-oxazolinylcyclohexane)sulfide,
2,2',2"-(1,3,5-phenylene)-tris(2-oxazoline).

The polymers having oxazoline groups are prepared by polymerization reaction of oxazoline monomers having an unsaturated double bond, if necessary, with other monomers.

The oxazoline monomers having an unsaturated double bond are represented by the following general formula (II);

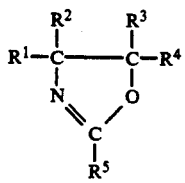

(in the formula, $R^1$, $R^2$, $R^3$, or $R^4$ independently represents a hydrogen, a halogen, an alkyl, an aralkyl, a phenyl, or a substituted phenyl group, and $R^5$ is a noncyclic organic group having an unsaturated double bond).

Practical examples are 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. One kind or a mixture of two kinds or more selected from these groups of monomers can be used. Among these monomers, 2-isopropenyl-2-oxazoline is preferred because of its commercial availability. The amount of oxazoline monomers in the polymer is not limited, but an amount of 1% by weight or more in the polymer is preferred. In the case of less than 1%, insufficient cure causes poor durability, water resistance and mechanical strength.

Other monomers having an unsaturated double bond are not limited unless they have functionality which can react with an oxazoline group. Preferable examples are (meth) acrylic acid esters such as methyl (meth) acrylate, butyl (meth) acrylate and 2-ethylhexyl (meth) acrylate, etc.; unsaturated nitriles such as (meth) acrylonitrile, etc.; unsaturated amides such as (meth) acrylamide and N-methylol (meth) acrylamide, etc.; vinyl esters such as vinyl acetate and vinyl propionate, etc.; vinyl ethers such as methyl vinyl ether and ethyl vinyl ether, etc.; α-olefins such as ethylene and propylene, etc.; halogen-containing α, β-unsaturated monomers such as vinyl chloride, vinylidene chloride and vinyl fluoride, etc.; α, β-unsaturated aromatic monomers such as styrene and α-methylstyrene, etc.; and one kind or a mixture of two kinds or more of monomers can be used.

The polymers having oxazoline groups can be prepared by various polymerization methods hitherto-known in public, for example, a suspension polymerization, a solution polymerization, an emulsion polymerization, etc.

If necessary, compounds having one oxazoline group can be jointly used as a diluent in addition to these polyoxazoline compounds or the polymers having oxazoline groups. Examples of these compounds are;
2-methyl-2-oxazoline,
2-ethyl-2-oxazoline,
2-isopropyl-2-oxazoline,
2-isopropenyl-2-oxazoline,
2-butyl-2-oxazoline,
2-cyclohexyl-2-oxazoline,
2-(3-cyclohexenyl)-2-oxazoline,
2-norbornenyl-2-oxazoline,
2-phenyl-2-oxazoline, etc.

The forms of these oxazoline compounds (A) are not limited. The compounds are used in the forms of an aqueous solution, an organic solvent solution, a water dispersion, a liquid or a melt, etc.

The compounds (B) useful in the practice of this invention includes a variety of such compounds having at least two functional groups of one or a plural kind selected from the group consisting of an aromatic hydroxyl group, an amino group and a thiol group. An amino group mentioned here denotes an amine having at least one hydrogen atom directly connected with the nitrogen atom.

Typical compounds having at least two aromatic hydroxyl groups are, for example, as follows:
hydroquinone,
resorcinol,
1,4-naphthalenediol,
1,3,5-benzenetriol,
2,2'-methylenebisphenol,
4,4'-methylenebisphenol(bisphenol F),
4,4'-(cyclohexanediyl)bisphenol,
4,4'-(1-methylethylidene)bisphenol(bisphenol A),
4,4'-phenylenebisphenol,
4,4'-thiodiphenol,
bis(4-hydroxy-3-methylphenyl)sulfide,
novolac resins,
poly(vinyl phenol).

Typical compounds having at least two amino groups are, for example, as follows;
ethylenediamine,
diethylenetriamine,
triethylenetetramine,
tetraethylenehexamine,
polyethyleneimine,
1,2-phenylenediamine,
1,3-phenylenediamine,
1,4-phenylenediamine,
2,3-toluilenediamine,
2,4-toluilenediamine,
2,5-toluilenediamine,
4,4'-diaminobiphenyl,
4,4'-diaminobiphenylmethane,
4,4'-diaminobiphenylsulfide,
4,4'-diaminobiphenylether.
2,2'-bis[4-(4-aminophenoxy)phenyl]propane, Typical compounds having at least two thiol groups are, for example, as follows;
1,2-ethanedithiol,
1,2-propanedithiol,
1,4-butanedithiol,
1,6-hexamethylenedithiol,
1,2-cyclohexanedithiol,
1,3-benzenedithiol,
1,4-naphthalenedithiol,
4,4'-thiobis-benzenethiol,
4-t-butyl-1,2-benzenethiol,
ethyleneglycol dimercaptoacetate,
dipentaerythritol tetrathioglycolate,
polyethyleneglycol dimercaptoacetate,
trimethylolpropane trithioglycolate,
pentaerythritol tetramercaptopropionate,
2,2'-dimercaptodiethy ether,
2-dibutylamino-4,6-dimercapto-1,3,5-triazine,
2,4,6-trimercapto-1,3,5-triazine.

The compounds having two kinds or more of the forementioned functional groups are also included. For example;
p-aminophenol,
p-mercaptobenzylamine,
p-hydroxybenzenethiol, etc.

The compounds (B) having at least two functional groups of one or a plural kind selected from the group consisting of an aromatic hydroxyl group, an amino group and a thiol group may be used in combination. Also, the compounds listed above can be substituted with the groups unless those react with an oxazoline group. The groups are, for example, an alkyl group, an aryl group, a halogen, a cyano, a nitro group, an alkoxy group, an aryloxy group, an alkylsulfide, an arylsulfide, an amido group or an ester group, etc.

Furthermore, compounds having both oxazoline groups and at least one functional group selected from the group consisting of an aromatic hydroxyl group, an amino group and a thiol group may be used. Examples are as follows;
2-(p-hydroxyphenyl)-2-oxazoline,
2-(p-mercaptophenyl)-2-oxazoline, etc.

Another important component in this invention is an onium salt (C) as a curing catalyst. The onium salt is a compound which is comprized of a cationic onium moiety and a counterion. Examples of the onium salts are combinations of cationic moieties such as sulfonium, oxonium, ammonium, iodonium, phosphonium, diazonium, nitronium and nitrosonium, and counteranions. The cationic moieties of the onium salts are, for example, as follows;
trimethylsulfonium salt,
diphenylmethylsulfonium salt,
2-butenyltetramethylenesulfonium salt,
3-methyl-2-butenyltetramethylenesulfonium salt,
benzyltetramethylenesulfonium salt,
benzyl-4-methoxyphenylmethylsulfonium salt,
trimethyloxonium salt,
triethyloxonium salt,
ammonium salt,
tetrabutylammonium salt,
benzyltrimethylammonium salt,
diphenyliodonium salt,
ethoxycarbonylmethyltributylphosphonium salt,
4-methoxybenzenediazonium salt,
4-nitrobenzenediazonium salt,
nitronium salt,
nitrosonium salt, etc.

The counteranions are, for example, as follows;
tetrafluroborate,
hexafluoroantimonate,
hexachloroantimonate,
hexafluorophosphate,
hexafluoroarsenate,
perchlorate,
trifluoromethylsulfite,
fluorosulfonate,
p-toluenesulfonate,
hydrogenephosphate,
hydrogenesulfate,
iodide,
bromide,
chloride,
fluoride, etc.

Among these onium salts, more preferable ones are a sulfonium salt, an oxonium salt, an ammonium salt, an iodonium salt, a nitronium salt and a nitrosonium salt.

The present invention provides a curing composition composed of a compound (A) having at least two 2-oxazoline groups, a compound (B) having at least two functional groups of one or a plural kind selected from the group consisting of an aromatic hydroxy group, an amino group and a thiol group, and an onium salt catalyst (C), which can be allowed to react with or without an organic solvent or water at a temperature in the range of from about ambient to 300° C.

The weight ratio of compound (A) and compound (B) is not limited, but a preferable range in their weight ratio (A:B) is from about 90:10 to 10:90. If deviated from this range, either one of the oxazoline group and a functional group reactive with oxazoline is not enough for an effective crosslinking reaction, which causes poor mechanical strength, heat resistance and adhesion properties.

A preferred amount of the catalyst (C) is in a range of from about 0.1 to 10% by weight to a total amount of compounds (A) and (B). If it is less than 0.1% by weight, the catalytic effect is practically insufficient for obtaining desirable properties. In case of more than 10% by weight, water resistance or mechanical strength of the cured resin is badly affected.

The curing composition of this invention can contain some additives if necessary, unless they affect the object of this invention. The additives are, for example, a plasticizing agent such as phthalic acid esters, etc.; a filler such as calcium carbonate, talc, clay, and mica, etc.; a pigment such as titanium white, zinc white, red iron oxide, and phthalocyanine, etc.; a dye.

The method to prepare a curing composition of this invention is not especially limited. Common technology can be widely used. For example, a solution or powder of compound (A), a solution or powder of compound (B), a solution or liquid or powder of a catalyst (C) and the above-described additive, if necessary, are mixed to prepare a composition.

The curing composition of this invention undergoes curing in short time (for example, 30 minutes or less), compared with the case of no catalyst, to produce a cured resin with superior mechanical strength, heat resistance and adhesion properties. Accordingly, the curing composition of this invention is useful for varieties of uses such as molding materials and coatings.

DESCRIPTION OF THE PREFERRED EMBODIMENTS

The following examples most typically describe the preferred embodiments of this invention, but this invention is not limited with the examples. Hereinafter, "Ph" denotes a phenyl group, "Me" a methyl group, and "%" denotes % by weight.

EXAMPLE 1

A mixture consisting of 30 g of 2,2'-(1,3-phenylene)-bis(2-oxazoline) (hereinafter, referred to as "PBO"), 20 g of a novolac resin (phenol-formaldehyde resin PN-80, made by Nippon Kayaku Co., Ltd., residual phenol 0.05% or less, OH equivalent 107) was melted and mixed at 175° C. To this mixture was added 0.5 g of diphenylmethylsulfonium tetrafluoroborate ($Ph_2MeS^+BF_4^-$), which was quickly mixed to get a homogeneous solution. Then, this solution was poured into a mold of glass plates with a silicon rubber spacer (3 mm thickness). The solution gelled after three minutes. The polymer was postcured at 175° C. for one hour to produce amber-colored transparent resin. The resulting resin was found to have a glass transition temperature (Tg) of 220° C. by a dynamic mechanical analyser RSA-2 (Rheometrics Far East Ltd., strain 0.1%, frequency 6.28 rpm).

COMPARATIVE EXAMPLE 1

The procedure of example 1 was followed except without diphenylmethylsulfonium tetrafluoroborate. No gelation occurred at 175° C. Tg of the product postcured at 225° C. for two hours was 140° C.

EXAMPLE 2

The procedure of example 1 was followed using 1.6 g of PBO, 0.4 g of 1,4-phenylenediamine and 20 mg of $Ph_2MeS^+BF_4^-$. The mixture gelled after 1 minute at 175° C. A product obtained by postcure at 175° C. for 1 hour was found to have a Tg of 208° C. by differential scanning calorimeter (DSC).

COMPARATIVE EXAMPLE 2

The procedure of example 2 was followed except without diphenylmethylsulfonium tetrafluoroborate. No gelation occurred at 175° C.

EXAMPLE 3

A mixture of 0.96 g of PBO, 0.64 g of 2,4,6-trimercapto-1,3,5-triazine (Zisnet F, made by Sankyo Kasei Co., Ltd.), 16 mg of $Ph_2MeS^+BF_4^-$ and 3.2 g of dimethylsulfoxide was heated at 150° C. The mixture gelled soon after a homogeneous solution was obtained and then, it was cured by further heating for 10 minutes. The resulting gel was triturated and washed with tetrahydrofuran and dried. Tg of the product was found as 159° C. by DSC.

EXAMPLES 4–14 AND COMPARATIVE EXAMPLE 3

In these examples, the effects of various onium salts on gel times of the PBO/bisphenol A system are shown. PBO 2.4 g, bisphenol A 1.6 g and an onium catalyst in Table 1 were used in each case. Heating was done at 175° C. and gel time was defined as the time from when a homogeneous solution was obtained until the loss of fluidity. The results are summarized Table 1.

TABLE 1

| | Onium catalyst (C) | % of catalyst [(C)/(A) + (B)] | Gel time |
|---|---|---|---|
| Example 4 | $Ph_2MeS^+ BF_4^-$ | 0.5 | 50 sec. |
| Example 5 | $Ph_2MeS^+ BF_4^-$ | 1.0 | 20 sec. |
| Example 6 | $Ph_2MeS^+ BF_4^-$ | 2.0 | 10 sec. |
| Example 7 | $Me_3S^+ BF_4^-$ | 2.0 | 30 sec. |
| Example 8 | $BTS^+ SbF_6^-$ | 2.0 | 20 sec. |
| Example 9 | $MBTS^+ SbF_6^-$ | 2.0 | 10 sec. |
| Example 10 | $Me_3S^+ I^-$ | 2.0 | 4 min. |
| Example 11 | $Me_3O^+ BF_4^-$ | 2.0 | 15 sec. |
| Example 12 | $NO_2^+ BF_4^-$ | 2.0 | 10 sec. |
| Example 13 | $NO^+ BF_4^-$ | 2.0 | 15 sec. |
| Example 14 | $Ph_2I^+ Cl^-$ | 5.0 | 18 min. |
| Comparative example 3 | None | — | >60 min. |

EXAMPLES 15–25 AND COMPARATIVE EXAMPLE 4

The procedure of example 4 was followed to investigate the effects of various onium salts on gel time using 3.2 g of PBO and 0.8 g of 1,4-phenylenediamine. The results are summarized in Table 2.

TABLE 2

| | Onium catalyst (C) | % of catalyst [(C)/(A) + (B)] | Gel time |
|---|---|---|---|
| Example 15 | $Ph_2MeS^+ BF_4^-$ | 0.5 | 1 min. |
| Example 16 | $Ph_2MeS^+ BF_4^-$ | 1.0 | 40 sec. |
| Example 17 | $Ph_2MeS^+ BF_4^-$ | 2.0 | 20 sec. |
| Example 18 | $Me_3S^+ BF_4^-$ | 2.0 | 20 sec. |
| Example 19 | $BTS^+ SbF_6^-$ | 2.0 | 30 sec. |
| Example 20 | $MBTS^+ SbF_6^-$ | 2.0 | 20 sec. |
| Example 21 | $Me_3S^+ I^-$ | 2.0 | 20 sec. |
| Example 22 | $NO_2^+ BF_4^-$ | 2.0 | 40 sec. |
| Example 23 | $NO^+ BF_4^-$ | 2.0 | 30 sec. |
| Example 24 | $BzEt_3N^+ Cl^-$ | 5.0 | 3 min. |
| Example 25 | $Ph_2I^+ Cl^-$ | 5.0 | 3 min. |
| Comparative example 4 | None | — | >60 min. |

EXAMPLE 26–34 AND COMPARATIVE EXAMPLE 5

The procedure of example 4 was followed to investigate the effects of various onium salts on gel time using 2.4 g of PBO and 1.6 g of 2-dibutylamino-4,6-dimercapto-1,3,5-triazine (Zisnet DB, made by Sankyo Kasei Co., Ltd.). The results are summarized in Table 3.

TABLE 3

| | Onium catalyst (C) | % of catalyst [(C)/(A) + (B)] | Gel time |
|---|---|---|---|
| Example 26 | $Ph_2MeS^+ BF_4^-$ | 0.5 | 1 min. |
| Example 27 | $Ph_2MeS^+ BF_4^-$ | 1.0 | 40 sec. |
| Example 28 | $Ph_2MeS^+ BF_4^-$ | 2.0 | 20 sec. |
| Example 29 | $Me_3S^+ BF_4^-$ | 2.0 | 2 min. |
| Example 30 | $BTS^+ SbF_6^-$ | 2.0 | 30 sec. |
| Example 31 | $MBTS^+ SbF_6^-$ | 2.0 | 20 sec. |
| Example 32 | $Me_3O^+ BF_4^-$ | 2.0 | 20 sec. |
| Example 33 | $NO_2^+ BF_4^-$ | 2.0 | 30 sec. |
| Example 34 | $NO^+ BF_4^-$ | 2.0 | 10 sec. |
| Comparative example 5 | None | — | >60 min. |

Symbols which represent the catalysts (C) in the above tables are as follows:

$Ph_2MeS^+BF_4^-$: diphenylmethylsulfonium tetrafluoroborate $Me_3S^+BF_4^-$: trimethylsulfonium tetrafluoroborate $BTS^+SbF_6^-$: 2-butenyltetramethylenesulfonium hexafluoroantimonate $MBTS^+SbF_6^-$: 3-methyl-2-butenyltetramethylenesulfonium hexafluroantimonate $Me_3S^+I^-$: trimethylsulfonium iodide $Me_3O^+BF_4^-$: trimethyloxonium tetrafluoroborate $NO_2^+BF_4^-$: nitronium tetrafluoroborate $NO^+BF_4^-$: nitrosonium tetrafluoroborate $BzEt_3N^+Cl^-$: benzyltriethylammonium chloride $Ph_2I^+Cl^-$: diphenyliodinium chloride

EXAMPLE 35

A copolymer of styrene with 2-isopropenyl-2-oxazoline, 8 g (styrene/2-isopropenyl-2-oxazoline 90/10 by weight, weight average molecular weight about 150,000), 2 g of a novolac resin (PN-80, made by Nippon Kayaku Co., Ltd., OH equivalent 107) and 0.1 g of $Ph_2MeS^+BF_4^-$ were mixed and heated at 200° C. for 5 minutes at a pressure of 200 kg/cm$^2$ by a press. A molded plate having thickness of about 1 mm was obtained. The tensile strength of the molded plate was found to have 4.9 kg/mm$^2$ by Instron type testing machine at a speed of 1 mm/minute.

COMPARATIVE EXAMPLE 6

The procedure of example 35 was followed except without diphenylmethylsulfonium tetrafluoroborate. The tensile strength was 3.4 kg/mm$^2$.

EXAMPLE 36

A mixture consisting of 13.75 g of PBO and 6.25 g of 4,4'-diaminodiphenylmethane was melted and mixed at 175° C. To this mixture was added 0.4 g of diphenylmethylsulfonium tetrafluoroborate (Ph$_2$MeS$^+$BF$_4^-$), which was quickly mixed to get a homogeneous solution. Then, this solution was poured into a mold of glass plates with a silicon rubber spacer (4 mm thickness). The solution was maintained at the temperature for 2 hours and postcured at 225° C. for 2 hours to produce a brown-colored transparent resin. The flexural strength and modulus of the resulting resin were found to be 19 kg/mm$^2$ and 405 kg/mm$^2$, respectively, by Instron type testing machine. Tg of the product was 239° C. by a dynamic mechanical analyser RSA-2 (Rheometrics Far East Ltd., strain 0.1%, frequency 6.28 rpm).

COMPARATIVE EXAMPLE 7

The procedure of example 36 was followed except without diphenylmethylsulfonium tetrafluoroborate. No gelation occurred under the same conditions.

What is claimed are:

1. A curing composition for the preparation of a crosslinked resin composed of a compound (A) having at least two 2-oxazoline groups, a compound (B) having at least two functional groups of one or a plurality selected from the group consisting of an aromatic hydroxyl group, an amino group and a thiol group, wherein the ratio of compound (A) to compound (B) is from 90:10 to 10:90, and an onium salt catalyst (C) which accelerates reaction of the compound (A) with the compound (B), said onium salt catalyst being present in an amount of from about 0.1 to 10% by weight based on the total amount of compounds (A) and (B), wherein a counter anion of said onium salt is at least one selected from the group consisting of a tetrafluoroborate, hexafluoroantimonate, hexachloroantimonate, hexafluorophosphate, hexafluoroarsenate, perchlorate, trifluoromethylsulfite, fluorosulfonate, p-toluenesulfonate, hydrogen phosphate, hydrogen sulfate, iodide, bromide, chloride and fluoride, and wherein a cationic part of said onium salt catalyst is at least one selected from the group consisting of sulfonium, oxonium, ammonium, iodonium, phosphonium, diazonium, nitronium and nitrosonium.

2. A molded article prepared by molding followed by curing a curing composition composed of a compound (A) having at least two 2-oxazoline groups, a compound (B) having at least two functional groups of one or a plurality selected from the group consisting of an aromatic hydroxyl group, an amino group and a thiol group, wherein the ratio of compound (A) to compound (B) is from 90:10 to 10:90, and an onium salt catalyst (C), said onium salt catalyst being present in an amount of from about 0.1 to 10% by weight based on the total amount of compounds (A) and (B), wherein a counter anion of the onium salt is at least one selected from the group consisting of a tetrafluoroborate, hexafluoroantimonate, hexachloroantimonate, hexafluorophosphate, hexafluoroarsenate, perchlorate, trifluoromethylsulfite, fluorosulfonate, p-toluenesulfonate, hydrogen phosphate, hydrogen sulfate, iodide, bromide, chloride and fluoride, and wherein a cationic portion of said onium salt is at least one kind selected from the group consisting of sulfonium, oxonium, ammonium, iodonium, phosphonium, diazonium, nitronium and nitrosonium.

* * * * *